United States Patent [19]

Lachman et al.

[11] Patent Number: 5,206,202
[45] Date of Patent: Apr. 27, 1993

[54] CATALYST DEVICE FABRICATED IN SITU AND METHOD OF FABRICATING THE DEVICE

[75] Inventors: Irwin M. Lachman; Mallanagouda D. Patil, both of Corning; Jimmie L. Williams; Raja R. Wusirika, both of Painted Post, all of N.Y.

[73] Assignee: Corning Incorporated, Corning, N.Y.

[21] Appl. No.: 735,861

[22] Filed: Jul. 25, 1991

[51] Int. Cl.$^5$ .................. B01J 23/02; B01J 23/10; B01J 27/04; B01J 32/00

[52] U.S. Cl. .................... 502/216; 502/300; 502/302; 502/314; 502/336; 502/338; 502/340; 502/353; 502/439; 502/527

[58] Field of Search ............ 502/336, 338, 439, 527, 502/302, 314, 300, 340, 353, 216

[56] References Cited

U.S. PATENT DOCUMENTS

| | | | |
|---|---|---|---|
| 3,904,553 | 9/1975 | Campbell et al. | 252/465 |
| 4,113,660 | 9/1978 | Abe et al. | 252/455 R |
| 4,295,818 | 10/1981 | Angwin et al. | 431/7 |
| 4,358,428 | 11/1982 | Fujita et al. | 423/239 |
| 4,637,995 | 1/1987 | DeAngelis et al. | 502/527 X |
| 4,782,039 | 11/1988 | Lindsey et al. | 502/304 |
| 4,783,436 | 11/1988 | Brandis et al. | 502/439 X |
| 4,900,712 | 2/1990 | Bar-Ilan et al. | 502/304 |
| 4,912,077 | 3/1990 | Lachman et al. | 502/302 |
| 5,036,037 | 7/1991 | Kladnig et al. | 502/319 |

FOREIGN PATENT DOCUMENTS

| | | |
|---|---|---|
| 0211443 | 2/1987 | European Pat. Off. . |
| 51-103889 | 9/1976 | Japan . |
| 51-47159 | 12/1976 | Japan . |
| 52-27062 | 3/1977 | Japan . |
| 52-61192 | 5/1977 | Japan . |
| 52-73172 | 6/1977 | Japan . |
| 55-17621 | 5/1980 | Japan . |

Primary Examiner—W. J. Shine
Attorney, Agent, or Firm—Richard N. Wardell

[57] ABSTRACT

The present invention features a process, and a product formed by the process, wherein a catalyst device is fabricated in situ. Metal powders, metal alloy powders and mixtures thereof are introduced to a substrate, by means of a washcoat suspension. After the suspension is applied, the metals are transformed into active catalyst and catalyst support materials. The process comprises the steps of: (a) introducing to a substrate, metal powders, metal alloy powders and mixtures thereof, having particles in average diameter sizes of approximately between 5 and 50 microns; and (b) transforming in situ the particles of the metals and metal alloys and mixtures thereof, whereby the metals, metal alloys and mixtures thereof are converted into active catalyst and catalyst support materials having sub-micron average diameter sizes.

27 Claims, 1 Drawing Sheet

CATALYST DEVICE FABRICATED IN SITU AND METHOD OF FABRICATING THE DEVICE

FIELD OF THE INVENTION

The invention relates to a method and product formed by fabricating a catalyst structure in situ, and more particularly to a catalyst structure whose metallic materials are transformed to an active catalyst phase upon the support or substrate.

BACKGROUND OF THE INVENTION

The present invention pertains to monolithic catalyst supports having a cellular or honeycomb structure.

Such catalyst supports are becoming increasingly useful in stationary emissions control of power plants and chemical synthesis and process facilities. A catalyst structure similar to that of the invention is usually fabricated by washcoating a monolithic support using techniques developed for the automotive industry.

A catalyst structure can also be fabricated by extruding a substantially homogeneous cellular ceramic composed of the catalyst and substrate materials. Alternately, similar extruded honeycombs can be impregnated with catalyst precursor compounds after fabrication, and then heat treated. Such structures are now being utilized in Japan and West Germany for $NO_x$ conversion.

Conventional washcoating techniques generally produce a coating of high surface area oxide in combination with one or more catalysts.

In automotive converters, the catalysts usually employed are noble metals, such as platinum, palladium and rhodium. These noble metals in the form of processor chemicals are coated upon the ceramic honeycomb support with high surface area support metal oxides, such as alumina and ceria, that are incorporated into the washcoat as oxides, precursor chemicals or mixtures.

The catalytic precursor chemicals are used with the washcoat at either an initial stage or a later stage of the process in order to provide good dispersion of the ultimate catalyst particles, which are usually in low concentration (e.g., less than one weight percent) in the solution. After washcoating, the coated support is dried and heated in a controlled atmosphere in order to convert the precursor chemicals to the phase appropriate for the intended catalytic operation.

By contrast to the conventional washcoats, however, the present invention uses metal powders, alloys and mixtures as precursors for eventual conversion into catalytic metal oxides/sulfides for dispersion on metal oxide support materials constituting the washcoat.

Also, the present invention not only converts the precursor metal powders to catalytic oxides/sulfides, but also greatly reduces their particle size after they have been washcoated upon the substrate. This unique step provides many advantages, one of which is the use of larger particles for catalyst metal precursors in the washcoat as compared to the ultimate catalyst particle size. The utilization of the large particles allows for ease of separation and recovery of expensive or toxic metal catalyst precursor particles in the waste solution. Also, the larger particles provide an easier handling of toxic metals, since harmful, small particles that cause dust, which can be injested or which can lodge in the pores of the skin, are avoided.

Another advantage of the invention is the one step washcoating procedure.

Another advantage of this invention is the ability to incorporate multiple catalyst precursors into the washcoat in one step, as compared with the multiple step procedures now commonly employed with conventional washcoating processes.

The conversion of the metals is accomplished by post fabrication treatments. For example, the catalyst and support metal precursors can be oxidized in situ by heat treating, or they can be utilized in conjunction with oxidizing or sulfiding heat treatments to oxidize or sulfidize them after the washcoat has been applied.

Enough metal precursor powder can be incorporated into the washcoat so that reserve metal can be further activated by further oxidation in situ, after the initial catalyst has lost potency with use.

The washcoats of this invention can be applied to ceramics, glass, metal or composite forms, including honeycombs and multicellular substrates.

DISCUSSION OF RELATED ART

Several patents describe catalyst processes similar to the invention. Amongst these are the processes and materials disclosed in U.S. Pat. Nos. 4,113,660; 3,904,553; and 4,900,712; and additionally in Japanese references nos. 51-103889; 52-061192; and 52-073172.

While many similarities can be found within these references with respect to the processes described within this invention disclosure, none of these cited references teach the inventive concept, i.e., admixing metal precursors of catalyst and support materials with support metal oxides/precursors in a washcoat slurry, which after application of same to a substrate, are subsequently converted to the active catalytic phase or phases in situ, and dispersed on the support metal oxide of the washcoat.

SUMMARY OF THE INVENTION

In accordance with the present invention, there is provided a process, and a product formed by the process, wherein a catalyst structure is fabricated in situ.

Metal powders, metal alloy powders, and mixtures thereof are incorporated into a washcoat slurry, which is coated on a substrate. After the slurry is applied, the embedded metals are transformed into active catalyst and catalyst support materials.

The process comprises the steps of:
(a) coating a substrate with, or introducing to a substrate, at least one of the group consisting of metal powders, metal alloy powders, and mixtures thereof, having particles in average diameter sizes exceeding approximately one or two microns; and
(b) transforming in situ the particles of the metals and metal alloys and mixtures thereof, whereby the metals, metal alloys and mixtures thereof are converted into active catalyst and catalyst support materials having average diameter sizes of less than approximately one or two microns.

In the process and product of this invention, the washcoat may also contain, in admixture with powder of metal and/or alloy, at least one of the group consisting of high surface area oxides, precursors of the oxides, and mixtures thereof.

Preferably, the metal particles of the washcoat have an average diameter size of approximately between 2 and 200 microns, and more preferably have an average diameter size in the approximate range of between 5 and 50 microns. These large particles are subsequently converted in situ, after application to the substrate, to small particles of sub-micron size, with average diameter size of substantially less than 1 or 2 microns.

The conversion of the particles is accomplished generally by heat treating the coated substrate, in order to oxidize the metal support materials and to convert the large metal catalyst particles to a smaller and more active phase.

The metals, separately or in the metal alloy, are preferably selected from the group consisting of rare earth elements, base metal transition elements having atomic number from 21 through 74, and alkaline earth metals. The powder of such metals are desirably 0.5 to 95%, and preferably 1 to 25% of the metal powders, metal alloy powders, high surface area oxides plus precursors of those oxides.

The high surface area oxides are preferably selected from the group consisting of oxides and phosphates of aluminum, silicon, titanium, zirconium, yttrium, alkaline earth metals, and rare earth elements, and mixtures thereof. The powder of the high surface area oxides is preferably 5 to 95% of the metal powders, metal alloy powders, high surface area oxides plus precursors of those oxides.

Also contemplated by this invention are other post treatments including the use of acidic or basic chemicals in addition to heat treating to accomplish the intended inventive result. For example, an $NO_x$ catalyst structure can be produced utilizing vanadium or vanadium alloy particles in a titania or titanium washcoat by treating the washcoat with a strong mineral acid followed by an oxidizing heat treatment. Other oxidizing and sulfiding processes are also within the purview and scope of the invention.

A catalyst structure for converting $SO_2$ to $SO_3$ for the production of sulfuric acid can be achieved by utilizing a washcoat containing vanadium or vanadium alloy particles in a silica+potassium sulfate slurry solution.

It is also contemplated to provide a catalyst structure by employing a Fischer-Tropsch process, with a washcoat containing iron(Fe), cobalt(Co), Fe-Co alloy in combination with aluminum or alumina.

Another process includes a steam reforming technique using nickel(Ni) with alumina, or molybdenum(Mo) with silica in a washcoat.

A further contemplated method involves a hydrogenation reaction utilizing manganese(Mn), nickel(Ni), and iron(Fe) in alumina or silica washcoat.

The substrates of the invention can be ceramics, glass, metal, metal alloy, intermetallic material, non-oxide inorganics, composites, or mixtures including honeycombs and cellular structures.

BRIEF DESCRIPTION OF THE DRAWINGS

A complete understanding of the present invention may be obtained by reference to the accompanying drawings, when considered in conjunction with the detailed description, in which.

DESCRIPTION OF THE PREFERRED EMBODIMENT

Figure 1:
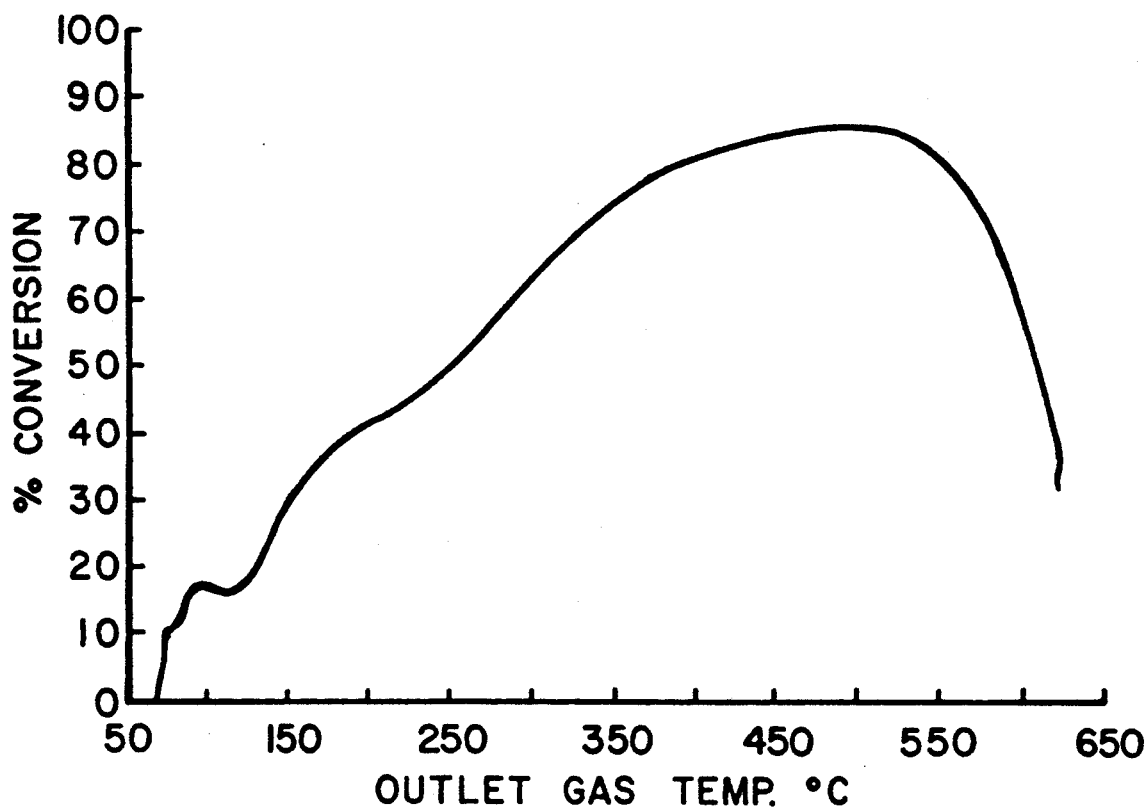
FIG. 1 illustrates a graph of an $NO_x$ conversion accomplished by a catalytic device fabricated according to the inventive process, wherein $FeV/Al_2O_3$ was washcoated upon a cordierite substrate heat treated at 500° C. for 6 hours in air in an electric furnace. Then the sample was acid treated in a $HNO_3/H_2O$ solution, ratio=1:2. The sample was then dried and heat treated again at 500° C. for 6 hours.

Generally speaking, the invention pertains to a process and a product of the process, wherein a catalyst structure can be fabricated in situ with the application of a one step washcoat and post heat treatment, oxidizing treatment, sulfiding treatment, or combination thereof, for converting the metals of the washcoat to active catalytic phase.

Base metal precursors or catalysts for any particular application are incorporated into a high surface area oxide formulation washcoat, thus becoming part of the washcoat.

After being applied to an applicable substrate and usually in suspension, the washcoated materials are subsequently heat treated in order to oxidize the metals. Depending upon the temperature, time and atmosphere, the oxide diffuses into the high surface area phase. This process can be enhanced further or intensified by treating the materials with oxidizing agents such as mineral acids, organic acids, chlorides, perchlorates, bases, etc.

Further heat treatment(s) in the proper atmosphere converts the dispersed base metal phase into the needed catalytic phase.

It is also possible to use reducing conditions in conjunction with sulfiding agents to produce catalytic base metal sulfides.

All the metal particles of the washcoat are in a size range exceeding 1 or 2 microns of average diameter, and are preferably in a range of from 1 or 2 microns up to about 200 microns.

More preferably, the metals of the washcoat are in the size range of approximately between 5 and 50 microns in average diameter.

These large particles are converted in situ. That is, after they have been washcoated upon the substrate, they are converted to a smaller average diameter particle in the sub-micron range with post washcoat treatments, such as oxidizing, sulfiding, heat treating, etc.

The processes and products of the invention do not contemplate the use of noble metals, but rather base metals, and are most appropriate to fabricating catalyst devices useful in $NO_x$ conversions.

Several substrates for $NO_x$ conversion were fabricated utilizing the inventive process, as set forth below by the following examples.

EXAMPLE 1

A catalyst structure having selective catalytic reduction (SCR) of $NO_x$ was fabricated by washcoating a ferro-vanadium and alumina washcoat on a number of cordierite honeycomb substrates, 400 cells/inch$^2$; 0.0065" wall.

The washcoat composition included 10% FeV (−325 mesh, from Shieldalloy Corp.) and 90% hydrated alumina (Versal-250 from Kaiser Chemicals).

Versal-250 (60 grams) and FeV (4.87 grams) powder was added slowly to a continuously stirred distilled water solution of 140 ml.

The pH of the solution was adjusted to 3.5 by the addition of dilute nitric acid solution (acid:water=1:1).

The slurry was stirred for an additional 30 minutes.

Cordierite honeycomb substrate pieces (1" diameter×1" length) were immersed for one minute in the slurry, and then excess slurry was removed from the channels of the cordierite honeycomb substrates by blowing compressed air through the channels. The sample was dried in an oven at 60° C. for about 16 hours, followed by firing at 500° C. for 6 hours in an air atmosphere within an electric furnace.

Each coated substrate was acid treated with 4 ml of dilute nitric acid (acid:water=1:1) and allowed to remain wetted for one-half hour at 60° C. They were then heat treated at 500° C. for 6 hours in an air atmosphere within an electric furnace.

These substrates were then tested for SCR% $NO_x$ in a catalytic bench test reactor. Gas flow used was: space velocity=30,403 ch/hr; gas composition: $NO_x$=1,000 ppm, $NH_3$=1,000 ppm, $O_2$=5%, $H_2O$ vapor=10%, $N_2$=balance.

Only $NO_x$ gas was monitored and $NO_x$ conversion as a function of the substrate temperature was recorded.

The results of the test are illustrated in FIG. 1.

EXAMPLE 2

A catalyst device having SCR% $NO_x$ was fabricated by washcoating a ferro-vanadium and titania washcoat on a number of cordierite substrates, 400 cells/inch$^2$; 0.0065" wall.

The washcoat composition included 10% FeV (−325 mesh, from Shieldalloy Corp.) and 90% titania (Degussa P-25 powder).

Titania (1.5 grams) and FeV (1.72 grams) powder was added slowly to a continuously stirred 100 ml distilled water solution.

The slurry was stirred for an additional 30 minutes.

Cordierite honeycomb substrate pieces (1" diameter×1" length) were immersed for one minute in the slurry, and then excess slurry was removed from the channels of the cordierite honeycomb by blowing compressed air through the channels. The sample was dried in an oven at 60° C. for about 16 hours, followed by firing at 500° C. for 6 hours in an air atmosphere within an electric furnace.

Each coated substrate was acid treated with 4 ml of dilute (1:2) nitric acid and allowed to remain wetted for one-half hour at 60° C. They were then heat treated at 500° C. for 6 hours in an air atmosphere within an electric furnace.

These substrates were then tested for SCR% $NO_x$ in a catalytic bench test reactor. Gas flow used was: space velocity=30,000 ch/hr; gas composition: $NO_x$=1,000 ppm, $NH_3$=1,000 ppm, $O_2$=5%, $H_2O$ vapor=10%, $N_2$=balance.

Only $NO_x$ gas was monitored and $NO_x$ conversion as a function of the substrate temperature was recorded.

Figure 2:
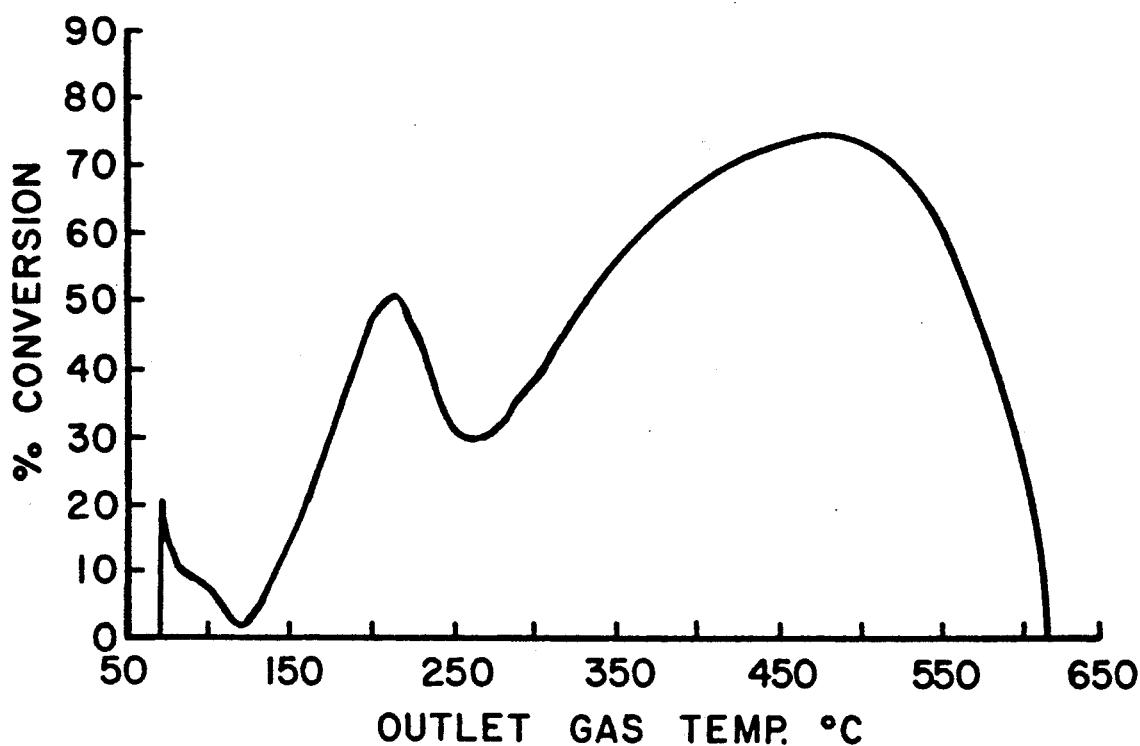
FIG. 2 depicts a graph of an $NO_x$ conversion accomplished by a catalytic device fabricated according to the inventive process, wherein $FeV/TiO_2$ has been washcoated upon a cordierite substrate, heat treated at 500° C. for 6 hours in air in an electric furnace. Then the sample was acid treated in a $HNO_3/H_2O$ solution, ratio=1:2. The sample was then dried and heat treated again at 500° C. for 6 hours.

The results of the test are illustrated in FIG. 2.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

What is claimed is:

1. A method of fabricating a catalyst structure in situ, wherein at least one of a group of metal powders, metal alloy powders and mixtures thereof, are introduced to a substrate and then transformed into active catalyst and catalyst support materials, comprising the steps of:
   (a) introducing to a substrate, at least one of a group of metal powders, metal alloy powders and mixtures thereof, said metal powders, metal alloy powders, and mixtures thereof having particles in average diameter sizes exceeding approximately one or two microns; and
   (b) transforming in situ said particles of said metal powders and metal alloy powders and mixtures thereof, whereby said metals, metal alloys and mixtures thereof are converted into active catalyst and catalyst support materials having average diameter sizes of less than approximately one or two microns.

2. The method of claim 1, wherein said particles of step (a) have an average diameter size of approximately between 2 and 200 microns and said particles of step (b) have an average diameter size of approximately less than 2 microns.

3. The method of claim 1, wherein said particles of step (a) have an average diameter size of approximately 5 to 50 microns and said particles of step (b) have an average diameter size of substantially less than 1 or 2 microns.

4. The method of claim 1, wherein said metal powders, metal alloy powders and mixtures thereof are transformed in situ by an oxidizing process.

5. The method of claim 1, wherein said metal powders, metal alloy powders and mixtures thereof are transformed in situ by a sulfiding process.

6. The method of claim 1, wherein said metal powders, metal alloy powders and mixtures thereof are transformed in situ by an acidic process.

7. The method of claim 1, wherein said metal powders, metal alloy powders and mixtures thereof are introduced to a substrate in step (a) by washcoating said substrate with said metal powders, metal alloy powders and mixtures thereof.

8. The method of claim 7, wherein a washcoat of step (a) contains oxides and oxide precursors selected from a group of oxide materials consisting of: aluminum, silicon, titanium, zirconium, yttrium, phosphates, alkaline earths, rare earths and mixtures thereof.

9. The method of claim 1 wherein the metal of the metal powders and metal alloy powders are selected from the group of metals consisting of: rare earth elements, base metal transition elements from atomic number 21 through 74, and alkaline earth metals, and the introducing step comprises washcoating the substrate.

10. The method of claim 9, wherein said particles of step (a) have an average diameter size of approximately between 2 and 200 microns, and said particles of step (b) have an average diameter size of approximately less than 2 microns.

11. The method of claim 9, wherein said particles of step (a) have an average diameter size of approximately 5 to 50 microns, and said particles of step (b) have an average diameter size of substantially less than 1 or 2 microns.

12. The method of claim 9, wherein said metal powders, metal alloy powders and mixtures thereof are transformed in situ by an oxidizing process.

13. The method of claim 9, wherein said metal powders, metal alloy powders and mixtures thereof are transformed in situ by a sulfiding process.

14. The method of claim 9, wherein said metal powders, metal alloy powders and mixtures thereof are transformed in situ by an acidic process.

15. The method of claim 9, wherein a washcoat of step (a) additionally contains oxides, oxide precursors and mixtures thereof selected from a group of oxide materials consisting of: aluminum, silicon, titanium, zirconium, yttrium, phosphates, alkaline earths, rare earths and mixtures thereof.

16. A catalyst structure formed in situ, comprising in combination:
   a substrate or support having a plurality of surfaces for supporting a catalyst and catalyst support materials; and
   a washcoat deposited upon said plurality of surfaces comprising in suspension, metal powders, metal alloy powders and mixtures thereof selected from a group of metals consisting of: rare earth elements, base metal transition elements from atomic number 21 through 74 and alkaline earth metals, having particles in average diameter sizes of approximately between 5 and 50 microns, said particles being transformed in situ after deposit upon said substrate or support, to particles having average diameter sizes of approximately less than 1 or 2 microns, whereby an active catalyst structure is formed.

17. The catalyst structure of claim 16, wherein said transformed particles comprise metal oxides.

18. The catalyst structure of claim 16, wherein said transformed particles comprise metal sulfides.

19. The catalyst structure of claim 16, wherein the washcoat contains at least one high surface area oxide powder or high surface area oxide precursor in suspension.

20. The catalyst structure of claim 16, wherein said metal powders, metal alloy powders and mixtures thereof, are selected from a group of metal powders consisting of: aluminum, silicon, titanium, zirconium, yttrium, phosphates, niobium and tantalum.

21. The catalyst structure of claim 16, wherein said metal powders, metal alloy powders, or mixtures thereof in said washcoat suspension are in the approximate range of between 0.5 to 95% of said solids by weight.

22. The catalyst structure of claim 16, wherein said metal powders, metal alloy powders, or mixtures thereof in said washcoat suspension are in the approximate range of between 1 to 25% of said solids by weight.

23. The catalyst structure of claim 22, wherein said washcoat contains 5 to 95% oxide powders, or oxide precursors selected from a group consisting of: aluminum, silicon, titanium, zirconium, yttrium, phosphates, alkaline earths, rare earths and mixtures thereof.

24. The catalyst structure of claim 16, wherein said substrate or support comprises a monolith.

25. The catalyst structure of claim 16, wherein said substrate or support comprises a honeycomb structure.

26. The catalyst structure of claim 16, wherein said substrate or support comprises a cellular structure.

27. The catalyst structure of claim 16, wherein said substrate or support is selected from a group of materials consisting of: ceramics, metals, metal alloys, intermetallic materials, non-oxide inorganic materials, and mixtures thereof.

* * * * *